United States Patent [19]

Nelson

[11] Patent Number: 4,479,875
[45] Date of Patent: Oct. 30, 1984

[54] INLET DISTRIBUTOR FOR LIQUID-LIQUID SEPARATORS

[75] Inventor: Stephen R. Nelson, Edmond, Okla.

[73] Assignee: Kerr-McGee Refining Corporation, Oklahoma City, Okla.

[21] Appl. No.: 528,145

[22] Filed: Aug. 31, 1983

[51] Int. Cl.³ .............................................. C02F 17/02
[52] U.S. Cl. .............................. 210/519; 210/DIG. 5; 210/462
[58] Field of Search ............ 210/265, 437, 519, 532.1, 210/538, DIG. 5, 460, 462, 484

[56] References Cited

U.S. PATENT DOCUMENTS

| | | | |
|---|---|---|---|
| 1,760,216 | 5/1930 | Stockholder | 210/265 |
| 3,199,676 | 8/1965 | May | 210/DIG. 5 |
| 3,563,389 | 2/1971 | Mizrahi et al. | 210/532.1 |
| 3,830,371 | 8/1974 | Garcia | 210/265 |

Primary Examiner—Peter Hruskoci
Assistant Examiner—Karen Hodson
Attorney, Agent, or Firm—William G. Addison

[57] ABSTRACT

Apparatus for mounting in a fluid separation zone for improving the separation of fluids of different densities. The apparatus includes a distributor mounted within the separation zone provided with fluid openings having packing means disposed thereabout.

1 Claim, 1 Drawing Figure

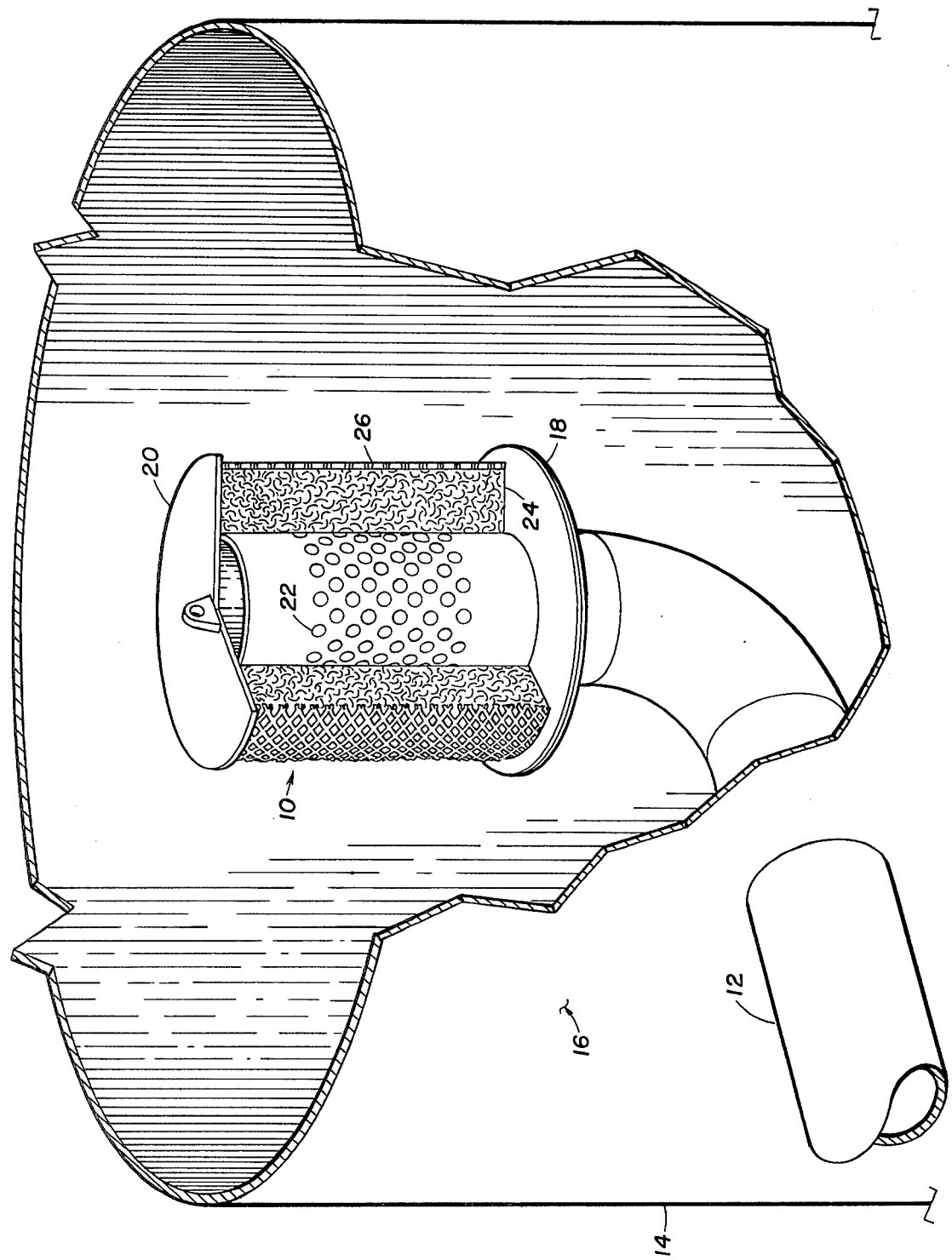

INLET DISTRIBUTOR FOR LIQUID-LIQUID SEPARATORS

BACKGROUND OF THE INVENTION

1. Field of the Invention

The present invention relates to apparatus adapted for mounting in a fluid separation zone to improve the separation of fluids of different densities.

2. Summary of the Invention

In industry various types of devices are employed to effect uniform distribution of fluids being introduced into contactors, separators and the like.

Heretofore, for example, when it has been desired to separate mixtures of fluids of varying densities, it has been common to introduce the fluids into a vessel and, by the passage of time, allow the mixture to separate into a fluid of light density and a fluid of heavy density.

It has been observed that when a stream of fluids of different densities is introduced into a calm pool of fluid maintained in a vessel, some turbulence results. The amount of turbulence created depends upon many factors including the velocity of the entering fluid stream, the kinetic energy of the entering fluid stream and the like.

When operating on a continuous basis, introduction of a fluid stream of such material into a quantity of like fluid undergoing phase separation, turbulence often occurs to such an extent that the fluid of higher density passes upwardly into admixture with the fluid of light density and leaves the top of the vessel as a re-admixture of the fluids. Obviously, such a result is unsatisfactory when one is attempting to effect a sharp separation of fluids of different densities.

To overcome this problem, a number of devices have been fabricated for mounting on the end or terminus of the entry pipe within the separation vessel to modify such factors as kinetic energy, inflow velocity and the like of the entering fluid to permit an effective separation of the fluids into components of different densities.

One such device consisted of four pipes extending radially from a central inlet pipe. The bottom half of each of the four pipes was cut away to provide a flow path for the entering fluid stream. Unfortunately, when this device was used it was discovered that the fluids exiting the pipes impinged on the inner vessel wall and caused such excessive turbulence that "carryover" of the fluid of higher density resulted.

Another device consisted of vertical slotted pipes fitted with caps on the open ends, each pipe being mounted on the end of four pipes extending radially from a central entry pipe. When fluid was introduced through this device, it was found that the fluid stream exited through the slots in the pipes only at the ends closest to the end caps and again caused excessive turbulence whereby "carryover" of the heavy density fluid from the vessel resulted.

The unsatisfactory results obtained using the foregoing devices indicated that a satisfactory device would have to be designed to provide a system which would provide sufficient pressure drop through the inlet pipe to result in a flow distribution of the fluid in a uniform, nonturbulent manner across the entire cross sectional area of the separator vessel.

*Perry & Chilton's Chemical Engineers' Handbook* indicates that, to be effective, the pressure drop through the inlet device must be at least ten times as great as the kinetic energy of the entering fluid stream. Applicant was unable to locate any commercially available apparatus which would effect such result. The present invention provides novel apparatus adapted to be mounted on the terminus of an entry pipe located within the separation vessel to effect rapid and complete separation of a stream of fluids having different densities. Utilization of this apparatus results in a sharp, clear separation of such fluids when a stream of the same is introduced into a separation vessel.

BRIEF DESCRIPTION OF THE DRAWING

For a more complete understanding of the apparatus of the present invention, reference is made to the single diagramatic illustration of the apparatus of this invention, with parts cut away.

DESCRIPTION OF THE PREFERRED EMBODIMENT

As illustrated in the drawing, the apparatus of the present invention comprises fluid distribution means 10 mounted on the terminus of entry means 12 which passes through the side wall 14 of separator vessel 16.

The fluid distribution means 10 comprises a fluid distributor including a bottom plate 18 surrounding entry means 12 and an end plate 20 enclosing the open end of entry means 12 within separator vessel 16. End plates 18 and 20 may be affixed to entry means 12 in any convenient manner, as for example, by welding.

As illustrated on the drawing, entry means 12 comprises a pipe of any suitable design, the terminal end of which is surrounded by fluid distributor 10. The side wall of the pipe intermediate the top section and the bottom section of the distributor is provided with a plurality of openings 22 disposed therethrough. Openings 22 may comprise holes, slots or the like.

The cross sectional area of the openings in the side wall of entry means 12 is sufficient, with respect to the cross sectional area of entry means 12, to reduce the kinetic energy of the fluid entering the separation zone to improve the gravitational separation of the contained fluid of lower density from the contained fluid of higher density.

Fluid distribution means 10 also includes packing means 24 disposed annularly about the side wall of entry means 12 between end plates 18 and 20.

Packing means 24 may include metal mesh, de-mister pads, pall rings, rashig rings or the like. Packing means 24 is operatively maintained in position within fluid distributor means 10 by enveloping means 26 extending between end plates 18 and 20.

Enveloping means 26 comprises an open mesh network of interconnecting metal webs and may be wire screening, expanded metal mesh or the like.

In continuous operation utilizing the apparatus of the present invention, a mixture of fluids having different densities is introduced through entry means 12 and through fluid distributor means 10 into a quantity of like fluid contained within separator vessel 16. Within separator vessel 16, the fluid of higher density settles to the lower region while the fluid of lighter density rises to the upper region of the vessel for withdrawal by means not shown.

Fluid passing through entry means 12 enters fluid distributor means 10 and passes through openings 22, the number and total cross sectional area of which provide the required pressure drop. The jets of fluid leaving the openings 22 are dispersed by passing through packing means 24 and then outwardly through enveloping means 26 into the fluid already contained within separator vessel 16.

The design of fluid distribution means 10 ensures a minimum of fluid turbulence and clean, sharp gravitational separation of the fluid of lower density from the fluid of higher density.

To further illustrate the advantages of the apparatus of the present invention reference is made to the following examples which illustrate the results obtained using such apparatus compared to use of prior art apparatus.

In the following examples a fluid mixture comprising fluids of light density of about 0.13 to 0.47 grams/c.c. and fluids of a heavy density of about 0.31 to 0.65 grams/c.c. were introduced continuously into separation vessels with a view of gravitationally separating the fluid of a lower density from the fluid of a higher density.

In the first example, the apparatus employed comprised a separator vessel having an entry pipe disposed through the side wall thereof with a distribution means comprising four slotted pipes mounted on the terminus of the entry pipe as described hereinabove.

The fluids of mixed densities were introduced through the pipe into the distributor means with a kinetic energy of about 0.4 p.s.i. Gravitational separation of the fluids of different densities did occur, however, because of the turbulence caused by the introduced fluids, considerable quantities of the separated fluid of heavy density was carried out of the top of the separator vessel in re-admixture with the fluid of lighter density.

In the second example, the apparatus of the present invention was employed. Again, the fluids of mixed density were introduced through the entry means at a kinetic energy of about 0.4 p.s.i. Because of the design of the apparatus of the present invention, only a minimum amount of turbulence occurred within the separator vessel and a clean, sharp gravitational separation of the fluid of lower density from the fluid of higher density occurred. No "carryover" of the fluid of lower density was observed.

While the present invention has been described with respect to what is believed to be the preferred embodiment thereof it will be understood, of course, that certain changes, modifications and the like may be made therein without departing from the true scope of the present invention as set forth in the appended claims.

What is claimed is:

1. Apparatus for mounting in a fluid separation zone adapted to improve the gravitational separation of fluids having different densities, said apparatus comprising:

fluid entry means opening into and disposed inwardly of said separation zone, fluid distribution means mounted upright upon the terminus of said fluid entry means within said separation zone, said fluid distribution means including: an elongated hollow member in fluid communication with said fluid entry means and having an end plate irremovably mounted upon and closing the terminal end thereof, another plate mounted about the elongated hollow member in oppositely spaced relation with respect to the end plate, a plurality of openings through said elongated hollow member transversely spaced along said member between said plates, packing means disposed annularly about said openings in said elongated hollow member between said plates and an enveloping open mesh network of interconnecting metal webs operatively enclosing the packing means between said end plates within the fluid distribution means, the cross sectional area of the openings in said elongated hollow member being sufficient, with respect to the cross sectional area of said fluid entry means, to reduce the kinetic energy of the fluid entering the separation zone to improve the gravitational separation of the fluid of lower density from the fluid of higher density.

* * * * *